Oct. 23, 1945.                H. L. KOENIG ET AL                2,387,590
                         POST SEAL FOR BATTERY CONTAINERS
                    Filed May 13, 1943                2 Sheets-Sheet 1
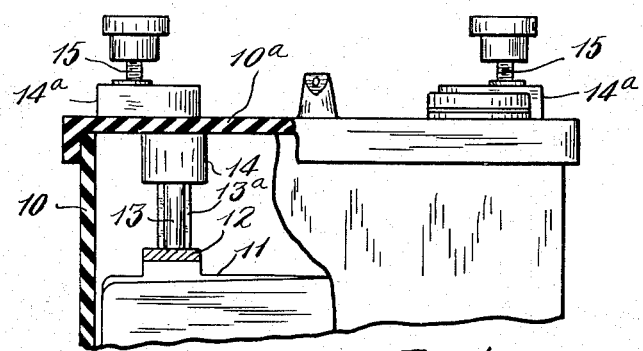
FIG. 1
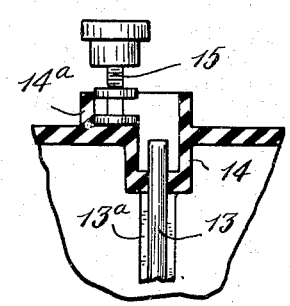
FIG. 2
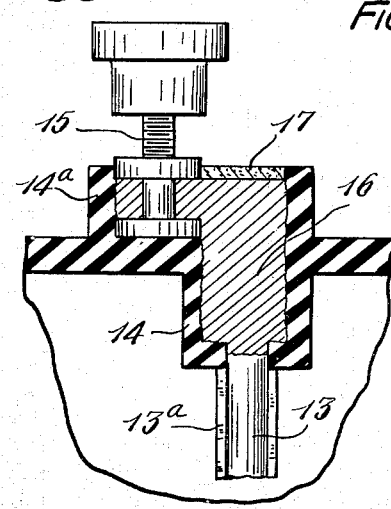
FIG. 3
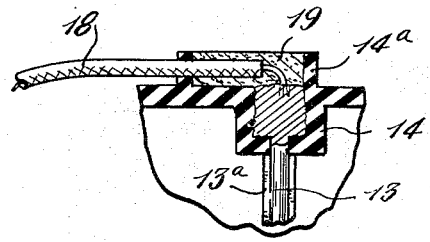
FIG. 4
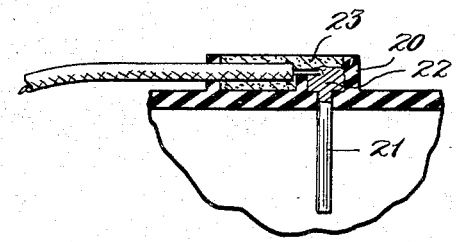
FIG. 5
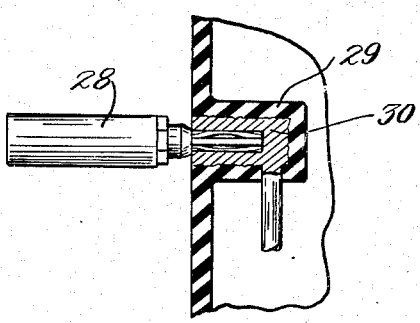
FIG. 7
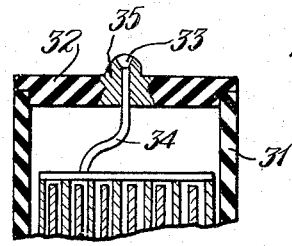
FIG. 8
FIG. 6
INVENTOR.
HEROLD L. KOENIG
BY WILLARD C. BILLHEIMER
HOWARD T. HAVLICK
*Kwis Hudson Baughton & Williams*
ATTORNEYS Patented Oct. 23, 1945

2,387,590

UNITED STATES PATENT OFFICE 2,387,590

POST SEAL FOR BATTERY CONTAINERS

Herold L. Koenig, Maple Heights, Willard C. Billheimer, Euclid, and Howard T. Havlick, Erieside, Ohio, assignors to Willard Storage Battery Company, Cleveland, Ohio, a corporation of West Virginia Application May 13, 1943, Serial No. 486,820

8 Claims. (Cl. 136—168)

This invention relates to a post seal for battery containers formed of polystyrene or other thermoplastic resins, and has for its object to provide a more effective seal than is obtained by the devices heretofore employed.

In accordance with the present invention, the post of the battery is extended into a well formed in the thermoplastic material, and molten lead, lead alloy, zinc, or like metal which has a fairly low melting point, is poured into the well and melts the top of the post and partially melts or softens the wall of the well so that the molten metal will penetrate it and thus form a perfect seal in the cover or container. For convenience, the molten metal will hereinafter be referred to as "lead" as that is the preferred metal. Generally, a terminal conductor has its end inserted in the well so as to be thoroughly covered with the molten lead and embedded therein when the lead has cooled, or by means of a mold form placed above the well an extension of the post is at the same time molded so that an intercell strap may be placed on the end of the extended post and lead-burned thereto. The invention may be used to advantage also in a construction wherein the molten lead serves as an intercell connector, and it may be employed also in connection with a terminal seal in the bottom of the container, as, for example, in a flashlight type of battery, and also as a seal for the centrally disposed flexible conductor at the top of the cell. In some instances where a jack plug is employed, the same procedure is followed except that an opening is drilled for the jack plug or jack.

The invention may take many different forms, some of which are disclosed in the present application.

The invention may be further briefly summarized as consisting in certain details of construction and combinations and arrangements of parts which will be described in the specification and set forth in the appended claims.

In the accompanying sheet of drawings,

Fig. 1 is a sectional view through the upper part of a battery formed in accordance with the present invention;

Fig. 2 is a sectional view showing the post extending up into the well before the molten lead is poured into the well;

Fig. 3 is an enlarged sectional view showing the post after the lead pouring operation and showing a terminal in the form of a screw-threaded member adapted to take a thumb nut, said terminal having its lower end embedded in the lead;

Figure 9:
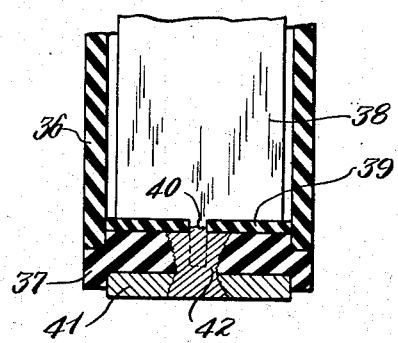
Figure 10:
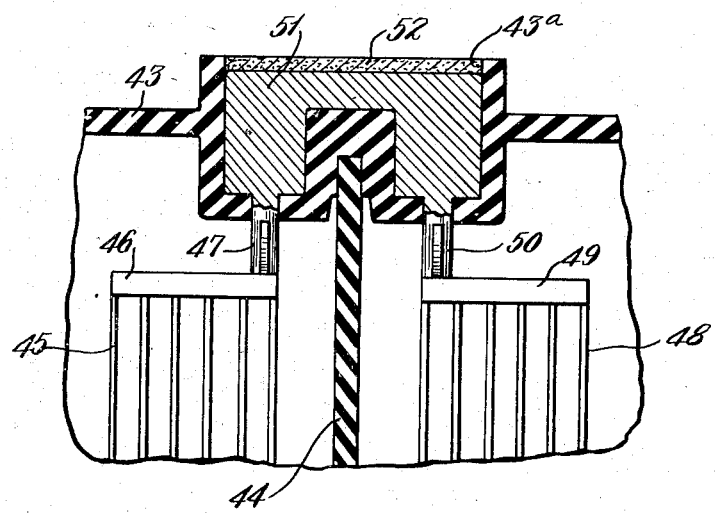

Figs. 4, 5, and 6 are similar sectional views showing various modifications which may be employed;

Fig. 7 is a sectional view taken through the body of the container to show the jack plug construction;

Fig. 8 is a sectional view of a flashlight type battery utilizing my invention for the upper contact;

Fig. 9 is a sectional view of a flashlight type of battery utilizing my invention in connection with a contact or terminal seal in the bottom of the container; and Fig. 10 is a sectional view of a construction in which the lead which makes contact with the post serves also as an intercell connector.

Referring now to the drawings and first to Fig. 1, 10 represents the container which has a cover 10a and contains a plurality of battery plates 11 connected to straps 12 from which extend posts 13 the upper ends of which extend into wells and are fused by molten lead which is poured into each well. In this instance only one of the posts is shown but it will be understood that the construction will be duplicated at both ends of the battery.

For the covers or other parts of the containers having wells into which extend posts or conductors which are fused by molten lead poured into the wells, we prefer to employ a thermoplastic resinous material such as Polystyrene, Vinylite, and the like. The other parts of the containers may be formed of any suitable insulating material.

Referring to Figs. 2 and 3 of the drawings, 14 represents a well molded integral with the underside of the cover 10a and with a lateral extension 14a molded integral with the upper side of the cover. As shown in Fig. 2, the post 13 extends a short distance into the well 14 from the interior of the battery, this post being provided with a pair of shoulders beneath the well so as to serve as a holddown for the battery element. Next, a terminal member, in this instance a threaded terminal member 15, is supported in position, and molten lead is poured into the well and, as shown at 16 in Fig. 3, the molten lead melts the part of the post which extends up into the well and embeds the lower part of the terminal member 15 into what may be termed an integral structure with the lead and post. However, what is more important is the effect that the molten lead has on the inner wall of the well. The molten lead not only softens the adjacent portion of the well but penetrates the inner wall thereof to form a substantially integral structure, thus forming a seal which is proof against any leakage of battery solution, which is not the case with rubber sealing sleeves and like expedients heretofore used in mounting the post in the cover of a battery. The present invention insures against short-circuiting paths between the terminals and reduces corrosion.

After the lead has been poured, the upper part of the well, including the extension 14a, is filled with sealing compound 17. Although under certain conditions we may fill the well completely with lead, ordinarily asphaltic sealing compound is employed, but similar materials, such as hard wax, may be utilized.

In Fig. 4 is shown a construction which differs from that first described in the form and the manner of connection of the terminal to the post. In this instance the well 14 and the extension 14a are formed substantially as in the construction first described, but a terminal in the form of a pigtail or flexible wire 18 is extended through the end of the extension 14a, with the end of the pigtail exposed or freed of insulating material. The upper end of the post is extended up through the well, and molten lead is poured into the well onto the top of the post and the end of the pigtail. Thus the upper end of the post is melted as before and the pigtail is embedded in the lead. The connection between the post and the pigtail is completed by compound 19 which is poured into the top of the well and the lateral extension or, if desired, the well extension may be completely filled with the molten lead. The action of the molten lead on the inner wall of the well takes place as previously described.

In Fig. 5 of the drawing the well 20 is formed entirely on top of the cover, it being understood that this well is formed integral with the cover when the cover is molded, as in the prior constructions. This construction is employed where a thinner or smaller diameter post 21 is utilized since not as much lead is required to melt it as to melt the larger post shown in Fig. 3. Here again the integral uniting of the lead, here designated 22, with the inner wall of the well occurs, as in the construction first described. The upper part of the well is filled with sealing compound 23, as in the previously described constructions.

In the construction shown in Fig. 6, the well 24 is formed integral with the lower side of the cover, and in this instance when the molten lead 25 is poured into the well, there is formed, by means of a mold member or form which is supported on the top of the well, a terminal extension 26 which is adapted to receive an intercell strap or connector 27. In this case, as before, the molten lead which is poured into the well melts the top of the post which extends up into the well and forms in effect an integral structure between the lead and the inner wall of the well.

In Fig. 7 we have shown a construction used when a jack plug 28 is employed. In this instance the well 29 is molded integral with the container a short distance below the cover, but, if desired, it can be molded on the underside of the cover. The post extends up into the well 29 and molten lead is poured as before, forming virtually an integral structure with the inner wall of the well. Then an opening is drilled into the body of lead 30 to receive the jack plug or so-called jack 28. In this instance the lead has the same effect on the inner wall of the well as before described. It will be noted that the post extends in this instance up through the side of the well. It will be understood, of course, that if the receptacle for the jack is formed in the cover the post will extend up into the lower end of the well.

In Fig. 8 we have shown a flashlight type of battery utilizing the present invention very effectively. In this figure, 31 is the case and 32 is a resinous plastic cover. The center contact is shown at 33 connected to a flexible conductor 34. Lead 35 in molten condition is poured into an opening in the cover with the cover backed by a suitable flat surface, and the lead 35 is integrally united to the plastic as before. By means of a mold the body of lead 35 is extended upwardly somewhat above the top of the cover 32. Then a hole is drilled through the body of lead 35, or, if desired, during the pouring operation a steel pin may be inserted centrally of the opening in the cover and later withdrawn to form the opening through which the flexible conductor 34 can be extended and lead-burned at the top to form the center contact 33.

In Fig. 9 we have shown the bottom of a storage battery of the flashlight type with our invention utilized to form a seal for the bottom contact which is usually a lead disk. In this instance the battery includes a plastic case 36 and a plastic bottom member 37. The plates 38 rest upon an insulating pad 39 and in this instance the central plate is provided with a lug 40 which extends through an opening in the pad. The lead disk 41 is shown as fitting closely within a circular recess in the bottom 37. In this case both the lead disk and the bottom 37 of the case are provided with aligned openings, and molten lead or equivalent material 42 is poured into these openings so as to fuse the bottom lug 40, the molten metal partially melting the plastic and forming a seal against the leakage of electrolyte through the bottom member 37 and of course also through the lead disk 41 which is also partially melted. In this instance, as before stated, the molten lead becomes integrally united with the plastic bottom member 37 and with the lead disk 41.

In Fig. 10 we have shown a construction in which the advantages of our invention are secured to a very high degree and in which our invention serves the additional purpose of an intercell connector. In this figure, 43 represents a portion of the cover of a battery which, as before, is formed of a resinous plastic. The plastic cover 43 is provided with a well 43a which in this case has its lower central part somewhat elevated to receive the cell partition 44. In this instance the lugs 45 of the plates of one polarity are connected to a strap 46 having a post 47 which extends up into the well adjacent the cell partition 44, and the lugs 48 of the plates of the opposite polarity are connected to a strap 49 having a post 50 which extends up into the well and is on the opposite side of the cell partition 44 and spaced therefrom the same distance as the post 47. In this instance the well is filled with molten lead 51 which melts the posts 47 and 50 and extends over the cell partition so as to electrically and mechanically connect together the two posts 47 and 50. In this instance, as before, the molten lead partially melts the plastic wall 43 and becomes substantially integrally united therewith. The molten lead may extend up to the top of the well, but otherwise the top part of the well will be filled with sealing compound 52.

Instead of using Polystyrene, the same effect can be obtained with the use of other materials, such as Vinylite, it being important only that the thermomaterial have a softening point less than the melting point of the lead and a flash point higher than the melting point of the lead.

Thus it will be seen that we have provided constructions wherein the molten lead penetrates the inner wall of the resinous plastic well and integrally joins the lead and plastic and forms an absolutely leakproof seal therewith and that the well may be formed in many different ways.

While we have shown several embodiments of the invention, we do not desire to be confined to the precise details shown and described but aim in our claims to cover all modifications which do not involve a departure from the spirit and scope of the invention.

Having thus described our invention, we claim:

1. In a battery, a container at least part of which is formed from a thermoplastic resinous material, an opening formed in the plastic, a terminal member extending into the opening and a seal for said terminal member, said seal being formed from metal united when in a molten state with the terminal member and with the inner wall of the opening.

2. In a battery, a container at least part of which is formed from a thermoplastic resinous material, a terminal member of the battery extending into an opening in the plastic portion of the container, and a seal for said terminal member, said seal being formed from metal united when in a molten state with the terminal member and with the inner wall of the opening.

3. In a battery, a container at least part of which is formed from a thermoplastic resinous material and provided with a well, a terminal member of the battery extending into the well, and a seal around said terminal member in said well, said seal being formed from metal united when in a molten state with the terminal member and with the inner wall of the well.

4. In a battery, a container at least a portion of which is formed of a thermoplastic resinous material, a well formed in said portion, a terminal member extending into the well, a second terminal member also extending into the well, and a seal around said post in said well, said seal being formed from metal united when in a molten state with both terminal members and with the inner wall of the well.

5. In a battery comprising a container at least a portion of which is formed from a thermoplastic resinous material, a well formed in said portion, a battery plate post extending into the well, a terminal extending into the well, and a seal in the well for said plate post and terminal, said seal being formed from metal, said metal while in a molten condition being poured into the well so as to fuse the post and to unite with the end of the terminal so as to penetrate the same and to provide a leakproof construction.

6. In a battery comprising a container at least a portion of which is formed from a thermoplastic resinous material, a well formed in said resinous material, a battery plate post extending into the well, a terminal extending into the well, and a seal in the well around said post and terminal, said seal being formed from metal, the metal while in a molten condition being poured into the well so as to fuse the post and to unite with the end of the terminal, said metal softening the inner wall of the well so as to penetrate the same, and sealing compound poured into the top of the well so as to cover the lead and the terminal.

7. The method of forming a leakproof construction around the plate post of a battery having a case formed at least in part from a thermoplastic resinous material, which comprises extending the post into an opening in said resinous material, pouring molten metal into the opening so as to melt part of the post extending into the opening and so as to soften the wall of the opening and cause the metal to penetrate said wall.

8. The method of uniting a battery post to a terminal so as to provide a leakproof construction in the cover of a battery formed of a thermoplastic resinous material, which comprises forming a well in said cover, extending the plate post and the terminal into the well, pouring molten lead into the well to fuse the portion of the post which extends into the well and unite with the end of the terminal and to soften the inner wall of the well so that the lead will penetrate the same, and pouring sealing compound into the upper part of the well.

HEROLD L. KOENIG.
WILLARD C. BILLHEIMER.
HOWARD T. HAVLICK.